United States Patent [19]
Rak et al.

[11] 4,257,887
[45] Mar. 24, 1981

[54] CIRCUIT AND APPARATUS FOR CONTROLLING A WATER SOFTENER

[75] Inventors: Stanley F. Rak, Mundelein; Donald P. DeVale, Sycamore, both of Ill.

[73] Assignee: Culligan International Company, Northbrook, Ill.

[21] Appl. No.: 79,072

[22] Filed: Sep. 26, 1979

[51] Int. Cl.³ ............................................. B01J 49/00
[52] U.S. Cl. .................................... 210/96.1; 210/140
[58] Field of Search .................. 210/25, 30 R, 96.1, 210/140, 143, 190, 191; 307/130, 131, 141, 141.4, 154; 324/65 R; 340/186, 187, 309.1

[56] References Cited
U.S. PATENT DOCUMENTS

| 3,159,573 | 12/1964 | Ritchie | 210/96.1 |
|---|---|---|---|
| 3,373,351 | 3/1968 | Rak | 324/30 |
| 3,675,041 | 7/1972 | Elliott et al. | 307/141 |
| 3,768,649 | 10/1973 | Fleckenstein | 210/140 |
| 3,926,071 | 12/1975 | Elliott | 74/567 |

Primary Examiner—Ivars C. Cintins
Attorney, Agent, or Firm—Hill, Van Santen, Steadman, Chiara & Simpson

[57] ABSTRACT

A novel electronic control circuit which includes a probe for detecting the conductivity in ion exchange material in a water softener and wherein the probe includes two pairs of spaced electrodes which are connected in a bridge circuit and connected so as to close an energizing circuit and latch it until it is time for regeneration and wherein the regeneration is controlled so that it will occur only at those times which are preset as, for example, during the night when the regeneration will not interfere with normal use of the water supply.

6 Claims, 2 Drawing Figures

CIRCUIT AND APPARATUS FOR CONTROLLING A WATER SOFTENER

BACKGROUND OF THE INVENTION

1. Field of the Invention

This invention relates in general to water softeners and in particular to a novel detecting and controlling system for a water softener.

2. Description of the Prior Art

Probes to indicate resistance changes in ion exchange material in water softeners are known as shown by issued U.S. Pat. No. 3,373,351 to Stanley F. Rak and resistance sensing probe systems are disclosed in U.S. Pat. No. 3,159,573 to H. D. Ritchie. However, these systems of the prior art are designed to immediately rejuvenate and recondition the ion exchange resin which can occur at times when it is desirable that water be supplied from such system.

Thus, in the prior art various systems have been known for causing regeneration of the resin bed of a water softener such as manual regeneration, or regeneration based on a control device which initiates regeneration at fixed given intervals of time. The problem with these two systems is that the regeneration may occur before it is needed or alternatively may not occur quickly enough and the water is not properly softened toward the end of the interval. A third system for water softening is based on a control which causes water softening when the condition of the output water and/or the resin bed indicates that regeneration should occur. The problem with this type of system is that regeneration can occur at periods when there is a high demand for soft water and during regeneration generally the soft water is not available and the unsoftened is bypassed by the water softener.

Other systems have utilized a pair of water softening or water conditioning apparatus each having separate control units and in which the units are interconnected with interlocking devices to prevent both units from being in the regenerating condition at the same time and an example of this type of system is disclosed in U.S. Pat. No. 3,675,041. Of course, this type of system is expensive in that two complete systems are required.

SUMMARY OF THE INVENTION

The present invention relates to a water softener system and control wherein a resistance sensing probe including two pairs of spaced electrodes are mounted in the ion exchange bed of the granular material carrying water softening ions to detect the condition of the ion exchange bed and when the condition is such that rejuvenation should occur a control circuit is placed in a latched condition to command rejuvenation. However, the control remains in the latched condition and rejuvenation does not occur until a preset time of day as, for example, during the night in order to assure that normal usage of water is not interrupted during the daytime. After the rejuvenation has occurred the circuit is reset ready to again detect the condition which requires rejuvenation.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figures 1, 2:
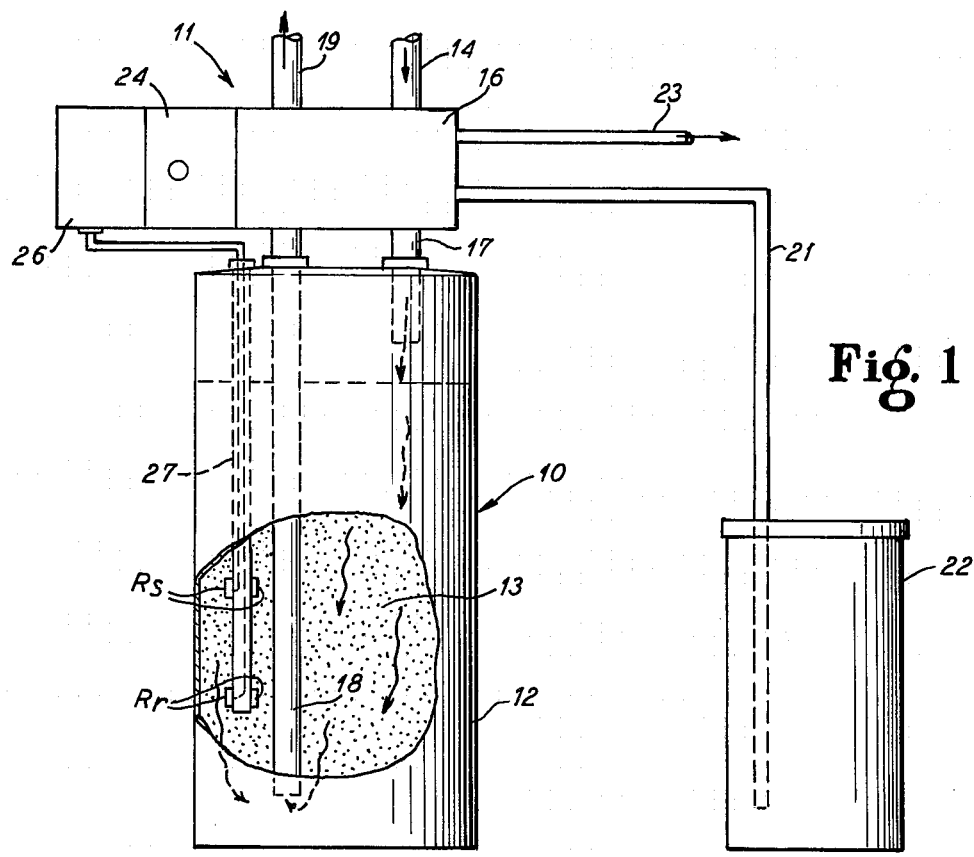
FIG. 1 is a plan view of a water softening system with certain portions cut away.
FIG. 2 is an electrical schematic of the control system of the invention.

FIG. 1 illustrates a water conditioning or softening apparatus or device generally indicated as 10 which has a control unit 11.

The water conditioning apparatus 10 includes a tank 12 containing a bed 13 of suitable ion exchange resin. So as to provide water to the tank, a water supply line 14 is connected to the valve housing 16 which passes the water through a pipe 17 which extends to the tank 12. The water passes down through the bed 13 and is removed by a pipe 18 through the valve housing 16 to a line 19 which supplies the softened water to the water system. A conduit 21 extends from the valve control to a brine tank 22 which contains salt for forming the brine. A drain conduit 23 is also connected to the valve housing 16 and is connected to a suitable drain.

The control valve structure 16 may be on conventional type as, for example, described in U.S. Pat. No. 3,926,071 and may be of either the two or five cycle type which systems are well known to those skilled in the art. The recycling control 24 controls the recycling and might be, for example, such as described in U.S. Pat. No. 3,926,071 and in the present invention comprises an electronic control 26 which assures that the recycling does not occur except at predetermined times as, for example, between 2:00 and 6:00 A.M. so that rejuvenation does not occur at other times when is desired to have softened water supplied for use.

The electronic control 26 of the present invention detects when rejuvenation of the resin bed should occur by the use of two pairs of vertically mounted electrodes $R_s$ and $R_r$ which are mounted in a suitable holding probe unit 27 which extends down into the tank 12 and are vertically spaced relative to each other and by detecting the resistivity determines when rejuvenation should occur and energizes a latching circuit. However, in the present invention rejuvenation of the resin bed is not immediately commenced when the condition is detected which indicates rejuvenation should occur, but rather the circuit of the invention remains in a latched condition until a time which has been preset during which it is desired to rejuvenate the resin at which time such rejuvenation will occur and the detecting circuit will then be reset after rejuvenation until rejuvenation is again required. In other words, in the present invention as soon as the resistivity difference between the detecting electrodes $R_s$ and $R_r$ is such that rejuvenation should occur then the circuit of the invention is placed in a latched condition and will remain in such latched condition until the resin is rejuvenated. However, the rejuvenation will not be initiated until the preset period as, for example, between 2:00 to 6:00 A.M. so that rejuvenation doesn't occur at those periods when there is a demand for softened water.

A pair of 60 cycle input power terminals 27 and 28 are connected to the primary 29 of a transformer T1 which has secondary windings 31 and 32. A bridge circuit 33 includes a pair of resistors R1 and R2 and a reference cell $R_r$ and a sensing cell $R_s$ connected in a bridge configuration. The junction point between resistors R1 and R2 is connected to one end of the secondary 32 and the other end of the secondary 32 is connected to the junction point between the sensing and reference cells $R_s$ and $R_r$. The other secondary winding 31 of transformer T1 has one end connected to the junction point between resistor R2 and the cell $R_r$ and the other side is connected to a diode D1 which has its other side connected to an input terminal of a voltage regulator 34. The junction point between resistors R1 and $R_s$ is connected to the negative input terminal of an operational amplifier A1 which comprises a comparator and which receives a regulated voltage $V_s$ which is supplied from an adjustable wiper contact 41 which engages a resistor R4 which has one end connected to a lead 42 that is connected to the other end of the secondary winding 31 of the transformer T1 and also provides an input to the voltage regulator 34. A resistor R5 is connected between the other end of the resistor R4 and the voltage regulator output lead 43. The output of the comparator A1 is connected to the junction point between the secondary 31 and the diode D1 by a resistor R3. A diode D2 is connected to the output of the comparator A1 and a capacitor C1 is connected between the other side of the diode D2 and lead 42. A resistor R6 is connected in parallel with the capacitor C1. A comparator A2 is connected to the diode D2 as shown and receives a reference input voltage V3 through a resistor R8 from lead 43 which is connected to the output of the voltage regulator 34. An energizing relay 36 is connected from the output of the comparator A2 to lead 44 which is connected between the diode D1 and the voltage regulator 34. The relay 36 controls relay contacts 46 and 47 so that they are connected together when the relay 36 is energized. The contact 47 is connected to the recycling control 24 and the contact 46 is connected to a normally opened contact 48 of a switch 49 which is connected to the recycling control 24. A cam 51 which is driven by a suitable clock motor is driven by shaft 52 at the output of the clock motor 53. The cam 51 has a high point portion 56 so as to close the switch contacts 49 and 48 during preset time periods as, for example, between 2:00 and 6:00 A.M. Thus, in the event the relay 36 has been energized so as to close the relay contacts 46 and 47, such contacts will remain closed and the relay 36 will remain energized by a latching circuit to be later described and when the switch contacts 46 and 47 are engaged by the energization of the relay 36 the time driven cam 51 will close the switch contacts 48 and 49 thus initiating recycling through the recycling control 24 so that the water softener will be recycled. After recycling has occured, the high point of the cam 56 will move out of engagement with the switch contacts 49 and 48 so that they will open. The latching circuit includes a comparator A3 which is connected to the output of the comparator A2 and which receives a second input from the voltage regulator 34 from lead 43 through resistor R8. The resistor R8 is also connected to the comparator A2. The output of the comparator A3 is supplied through a resistor R9 and a switch S1 to the input terminal of the comparator A2 to reset it by momentarily opening switch S1 when $R_s$ equals $R_r$ which indicates that the system has been rejuvenated. So as to open the switch S1 after rejuvenation has occurred, a cam 61 with a high portion 62 is also driven by the clock motor 53 and is mounted on the output shaft 52 of the clock motor. The high portion 62 is phased relative to the high portion 56 of cam 51 such that the switch S1 is only opened after the switch contacts 48 and 49 have been closed for a sufficient time to allow rejuvenation of the resin bed which condition also assures that the sensing cells $R_s$ and $R_r$ will be at the same resistivity so that when the switch S1 is opened the relay 36 will be de-energized opening the contacts 46 and 47 and the circuit will be reset until rejuvenation is required again. The clock 53 may be driven by suitable AC power supplied to terminals 67 and 68.

The voltage regulator 34 may be a type LM 34 OT which produces an output of 5 volts on lead 43, for example. The voltage comparators A1, A2 and A3 may be type CA339 QUAD voltage comparator wherein one of the comparators present in the unit is not utilized.

In operation, as the impedance of the sensing cell $R_s$ goes up, the voltage V1 at the output of the bridge 33 will increase and the positive half cycles of the applied voltage V1 from the bridge 33 to the comparator A1 will exceed the reference set level $V_s$ from potentiometer 41 and this will cause the comparator A1 to clamp the voltage V2 at the secondary 31 during the positive half cycles of the voltage V1. Since voltages V1 and V2 are in phase and the positive half cycles of V2 charge the capacitor C1 through the diode D2, when the voltage V2 is clamped by the comparator A1 during the positive half cycles, the capacitor C1 starts to discharge. On the other hand, when the comparator A1 does not clamp the voltage V2, the capacitor C1 is maintained in a charged condition.

The voltage across the capacitor C1 will start to decay and will decay through the resistor R6 to ground and the voltage across the capacitor C1 is supplied through the resistor R7 to the comparator A2. When the voltage V4 at the input of the comparator A2 becomes less than the reference voltage V3 from the regulator 34 through the resistor R8, the comparator A2 will clamp the end of the relay 36 to the voltage V5 (ground) thereby energizing it. The voltage V5 will be lower than the reference voltage V3 and comparator A3 will clamp the capacitor C1 to ground thereby locking the relay 36 in the energized position where it will remain energized until the switch S1 is momentarily opened at a time when the sensing cell and the reference cell have the same impedance.

The discharge time of the capacitor C1 can be set by selection of a resistor R6 to a value of about 30 seconds so as to prevent premature or false lock outs.

In the event the bridge is unbalanced in the reverse direction so that $R_r$ becomes greater than $R_s$ nothing happens since the voltages V1 and V2 at that time would be out of phase.

The resistor R9 protects the comparator A3 from a high inrush current but is low enough in value to maintain the voltage V4 below the voltage V3.

The bridge circuit consisting of the resistors R1, R2, $R_s$ and $R_r$ is connected to the transformer secondaries 31 and 32 such that when the sensing cell $R_s$ becomes greater than the reference $R_r$ (resistance) the bridge will be unbalanced to produce an AC voltage V1 which is in phase with V2. The comparator A1 receives the regulated voltage $V_s$ and the variable voltage V1 such that when V1 is less than $V_s$ the positive half of the voltage V2 will charge the capacitor C1 through the resistors R3 and the diode D2. The comparator A2 receives the applied voltage V4 which is essentially the voltage across the capacitor C1 and the voltage V3 is the reference voltage from the regulator and might be, for example, approximately 5.0 volts and when V4 is greater than V3 the relay 36 will not be energized.

The comparator A3 receives the applied voltage V5 which is high and might be, for example, approximately 12 to 14 volts when the relay is not energized and when V5 is greater than V3 no clamping action occurs at the output of the comparator A3.

The diode D1 and the capacitor C2 provide for rectification and filtering.

It is seen that this invention provides a novel electronic latching control circuit for a water softener which assures that rejuvenation of the resin bed will occur only when it is required. Furthermore, in view of the cam 51, the circuit will recycle only during the preset period as, for example, between 2:00 and 6:00 A.M. The reset cam 61 will open switch S1 momentarily only after recycling has been completed assuming that recycling was commanded by the relay 36.

A diode D20 is poled as shown in FIG. 2 and is connected between lead 42 and V1. A capacitor C20 is connected in parallel with coil 36.

Although the invention has been described with respect to preferred embodiments, it is not to be so limited as changes and modifications can be made which are within the full intended scope of the invention as defined by the appended claims.

We claim as our invention:

1. Apparatus for regenerating the ion bed of a water softener having a regenerating means and a recycling control connected to control the regenerating means comprising, two pairs of spaced electrodes mounted in the ion exchange bed and their resistivity depending on the condition of the ion exchange bed, comparing means connected to said pairs of electrodes to compare their resistivity and when the difference exceeds a predetermined difference the output of said comparing means changing condition, a latching means connected to said comparing means and latched to indicate regenerating of the ion bed is necessary for a period of time until said regeneration has been completed, and a timing means capable of being set to selected time periods connected to said recycling control and to said latching means to cause regenerating of said ion bed during a preset period when said latching means is latched, including a reset means for resetting said latching means and comprising a time delay means connected between said latching means and said pairs of spaced electrodes.

2. Apparatus for regenerating the ion exchange bed of a water softener having a regenerating means and a recycling control connected to control the regenerating means comprising, two pairs of spaced electrodes and at least one mounted in the ion exchange bed, a bridge circuit including said pair of electrodes, an A.C. power supply signal applied to said bridge circuit, a first comparator receiving a first input from said bridge circuit, a reference signal supplied to said first comparator, a relay with switch contacts operated by said first comparator, a latching circuit connected to said relay to maintain it energized, a timing means capable of being set to selected time periods, and a recycle switch controlled by said timing means and said recycle switch and the switch contacts of said relay connected in circuit with said recycling control including a reset switch connected to said latching circuit for resetting it and wherein said reset switch is controlled by said timing means to reset said latching circuit after said ion bed has been regenerated and including a time delay circuit connected between said first comparator and relay so that said relay is operated only if the output of said first comparator indicates that regeneration should occur for a fixed time period.

3. Apparatus according to claim 2 including a second comparator receiving the output of said time delay circuit and a reference signal and its output connected to said relay.

4. Apparatus according to claim 3 wherein said latching circuit includes a third comparator which receives a reference signal and the output of said second comparator and supplies its output to the input of said second comparator through said reset switch.

5. Apparatus according to claim 2 wherein said time delay circuit includes a capacitor and resistor.

6. Apparatus according to claim 5 including unilateral direction current means between said capacitor and said first comparator.

* * * * *